July 17, 1928.  1,677,733
J. SCHIFTNER
SUGAR HAULING APPARATUS
Filed March 23, 1927     3 Sheets-Sheet 1
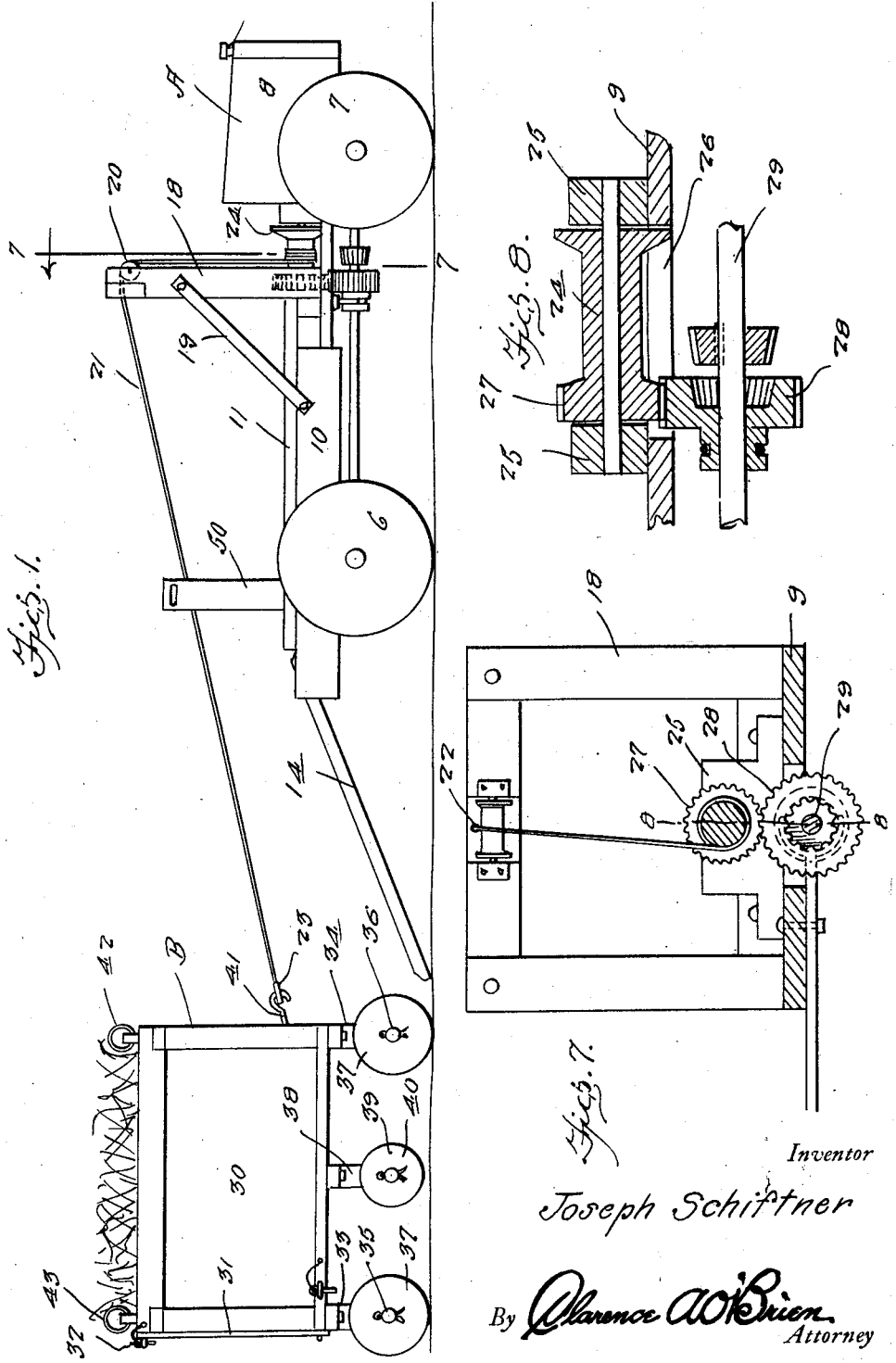
Inventor
Joseph Schiftner
By Clarence A. O'Brien
Attorney

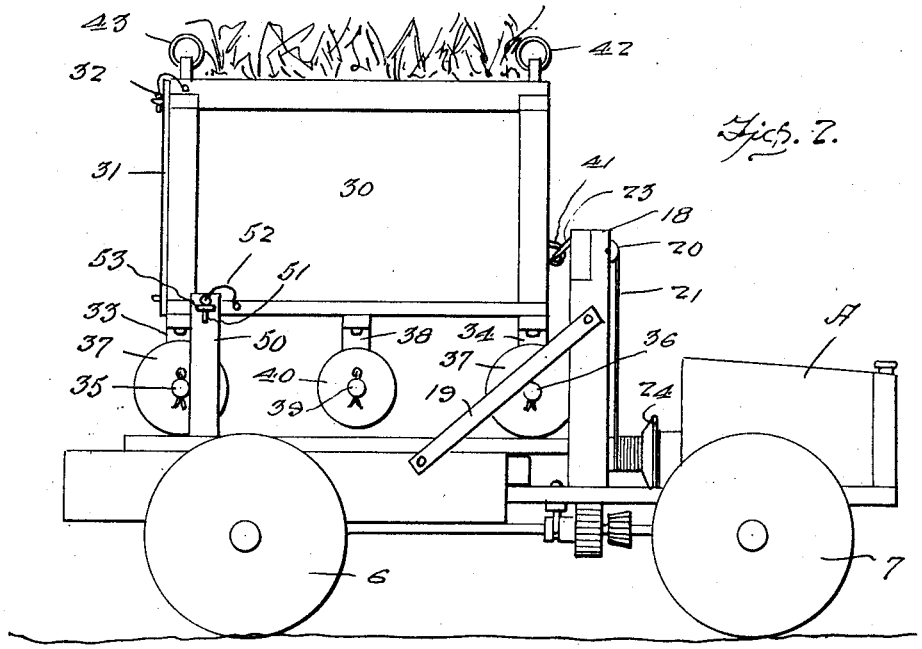
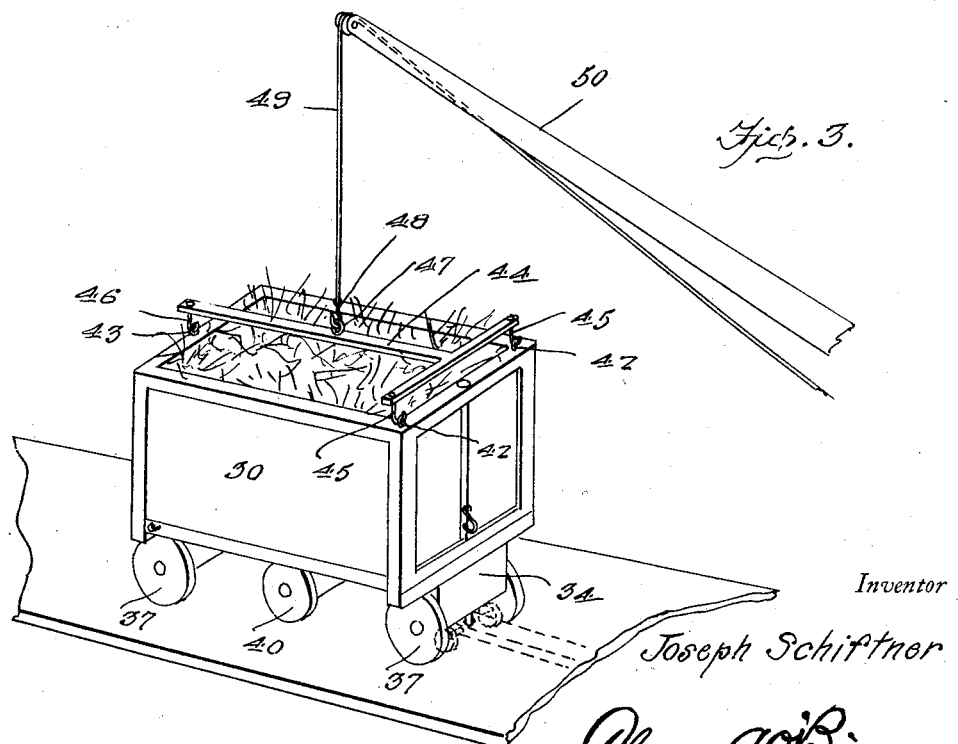

July 17, 1928.  
J. SCHIFTNER  
SUGAR HAULING APPARATUS  
Filed March 23, 1927  
3 Sheets-Sheet 3
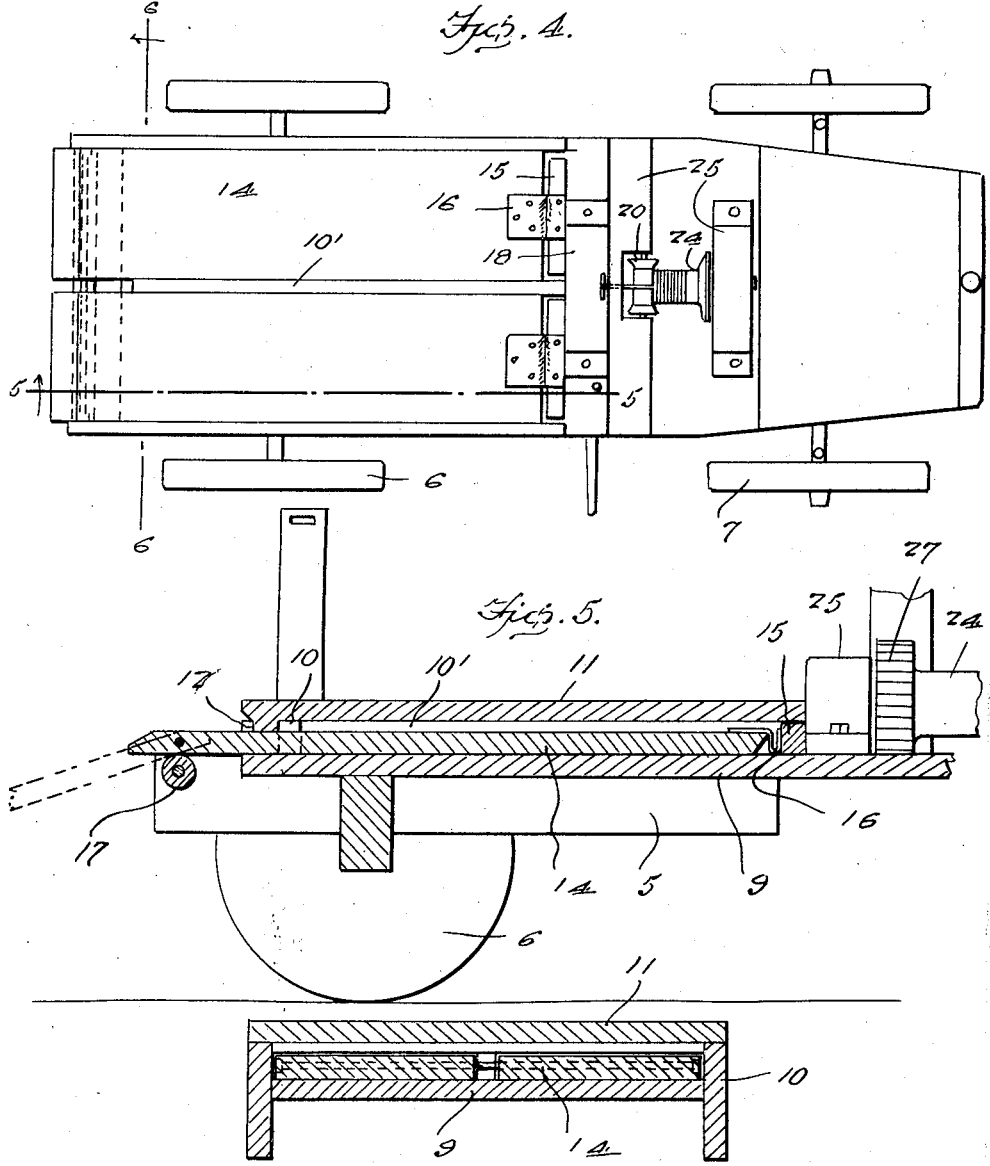
Inventor  
Joseph Schiftner  
By Clarence A. O'Brien  
Attorney Patented July 17, 1928.

1,677,733

UNITED STATES PATENT OFFICE.

JOSEPH SCHIFTNER, OF LA GLORIA, CUBA.

SUGAR-HAULING APPARATUS.

Application filed March 23, 1927. Serial No. 177,784.

The present invention relates to an apparatus for hauling sugar from the cane fields to the refinery, and aims to provide an apparatus whereby a plurality of cane cars may be left in the field to be filled and the use of one or more trucks having mechanism associated therewith whereby the cane cars may be easily and quickly pulled onto the truck to be hauled to the refinery, and may be readily unloaded therefrom.

As is well known, it is now the common practice in the harvesting of sugar cane, to use oxen, or other slow draft animals, to draw the cane cars from the field to the refinery, and considerable time is lost in this way, and the harvest is made very expensive. It is not feasible to use automobile trucks because of the length of time it would require to actually load the trucks. My idea is to use improved cane cars, and trucks, the trucks doing the hauling from the vicinity of the field to the refinery, while the cars are actually used in the field. Thus I maintain the efficiency and economy of the present system, in combination with the efficiency and economy of modern automobile truck hauling.

Another very important object of the invention lies in the provision of an improved truck, having a gang plank structure, which forms a part of the truck, and may be conveniently and easily slid to an extended position or to a non-using position.

Another very important object of the invention lies in the provision of means whereby the truck may pull the cane car up the gang plank structure onto the truck.

Another important object of the invention lies in the improved cane cars which are capable of being hauled up the gang plank onto the truck, and which have associated therewith means whereby a derrick may readily lift them from the truck at the refinery.

With the above and numerous other objects in view, as will appear as the description proceeds, the invention resides in certain novel features of construction, and in the combination and arrangement of parts as will be hereinafter more fully described and claimed.

In the drawings:

Figure 1 is a side elevation of a truck and a cane car in position to be pulled up onto the truck.

Figure 2 is a side elevation of the same apparatus showing the cane car on the truck.

Figure 3 is a perspective view, showing particularly the means for engaging the cane car with the cable of a derrick.

Figure 4 is a top plan view of the truck, showing the floor removed.

Figure 5 is a detail section, taken substantially on the line 5—5 of Figure 4.

Figure 6 is a transverse section, taken substantially on the line 6—6 of Figure 4.

Figure 7 is an enlarged detail vertical view, taken substantially on the line 7—7 of Figure 1, and Figure 8 is a detail section, taken substantially on the line 8—8 of Figure 7.

Referring to the drawing in detail, it will be seen that the letter A, denotes generally the truck and the letter B denotes generally one of the cane cars. The truck has the chassis structure 5, mounted on wheels 6 and 7, in any suitable preferred manner. An engine 8 is mounted at the front of the chassis bar, for driving the truck in any suitable well known manner. The numeral 9 denotes a bottom mounted on the chassis 5 and side walls 10 rise therefrom, and a floor 11 spans the upper edges of the side walls 10 to be disposed in spaced superimposed parallel relation to the bottom 9. The floor 11 at its rear end is provided with a transverse shoulder projecting downwardly from its bottom face, as is denoted at 12, terminating sufficiently far from the bottom 9 to allow a pair of gang planks 14 to slide between the shoulder 12 and the bottom 9 to the position shown in Figure 5 or to the position shown in Figure 1. These gang planks are spaced from each other, by a partition wall 10'. Blocks 15 are connected to the forward ends of the gang planks 14, by flexible members 16 made of canvas or like material. These blocks 15 are sufficiently thick as to be incapable of passing by the shoulders 12, so that the gang plank cannot be totally disengaged from the truck unless the floor 11 is raised. In order to facilitate the movement of the gang planks, rollers 17 are journaled between the sides of the chassis 5 to the rear of the bottom 9, over which the gang planks may roll clear of the floor 11 and then swing to the dotted line showing in Figure 5, at which time the members 16 will be taut.

A frame 18 rises from the bottom 9 at the front end of the floor 11 and is braced to the side walls 10 by rods 19. A pulley 20 is journaled in the upper portion of the frame and a cable 21 is trained thereover through an opening 22 in the upper portion of the frame 18. One end of this cable has an eye 23 thereon, while the other end of the cable is wound or adapted to wind about a wedge 24, which is journaled in bearing brackets 25 at the bottom of the frame and above an opening 26, in the bottom 9. One end 27 of this wedge 24 is in the form of a gear meshing with the gear 28 on drive shaft 29, of engine 8, to be driven thereby through a suitable clutch mechanism, or any other preferred means, such as is illustrated in Figure 8.

The cane car B comprises a body 30, formed in any suitable manner, preferably in accordance with the well-known practice, having a detachable end gate 31 which is held in a closed position by a suitable fastener 22. Axle brackets 33 depend from the forward and rear ends of the body 30 and carry respectively axles 35 and 36, on which are journaled wheels 37, all of which are of the same size. A third axle structure 38 depends from the center of the body 30 and supports an axle 39, on approximately the same level as the axles 35 and 36, but having journaled thereon wheels 40 of a much smaller diameter than wheels 37. A hook 41 projects forwardly from the forward end of the body to be engaged by the ring 23, as is clearly shown in Figure 1. A pair of rings 42 are mounted in the front corners of the top of the body 30, while a similar ring 43 is mounted at the center of the top of the rear of this body 30. A T-shaped member 44 has hooks 45 and 46 at its extremities engageable respectively with rings 42 and 43. An eye 47 is mounted at the approximate center of the T-shaped member to be engaged with a hook 48, on a cable 49, forming part of a frame structure 50.

In using this apparatus, the cars 30 are distributed in the field at the convenient point for the harvest and after they have been loaded may be pushed to a roadway on which trucks may travel. Now a truck may be backed up to the front end of the car and the gang planks let down to the position shown in Figure 1. Then the cable 21 may be engaged with the car through hook and eye 41 and 23. Then, by operation of the winch 24, the car may be moved up the gang plank, and as it gets to the top of the gang plank, it will be seen that the small wheel 40 will engage the top of the gang plank, so as to function as a fulcrum to rock the car as it goes over the end of the truck. Then the car is pulled all of the way onto the automobile, and the hook is held in close proximity to the top of the frame 18. To further secure the car in place, posts 50 rise from the sides of the truck and pins 51 on wires or cards 52, attached to the cars are inserted through eyelets 53 on the posts. The truck then carriers the cane car to the refinery and may be lifted from the truck by derricks such as are shown in Figure 3, to advantage because of the T-shaped member 44 as heretofore described.

It is thought that the construction, operation, and advantages of this invention will now be clearly understood by those skilled in this art, without a more detailed description thereof. The present embodiment of the invention has been disclosed in detail merely by way of example, since in actual practice, it attains the features of advantage enumerated as desirable in the statement of the invention and the above description. It will be apparent that the changes in details of construction, in the combination and arrangement of parts may be resorted to without departing from the spirit or scope of the invention as hereinafter claimed or sacrificing any of its advantages.

Having thus described my invention, what I claim as new is:

1. In combination, a truck body comprising a bottom, side walls rising from the bottom, a floor on the side walls, a gang plank movable between the bottom and the floor and between the side walls, a block, flexible means connecting the block with the gang plank, and a shoulder depending from the floor at the rear end thereof allowing the passage of the gang plank but preventing passage of the block.

2. In combination, a truck body comprising a bottom, side walls rising from the bottom, a floor on the side walls above the bottom to provide a space therebetween, a gang plank movable between the bottom and the floor and between the side walls, a block, flexible means connecting the block with the gang plank, said block being movable in said space between the floor and the bottom, a shoulder depending from the floor at the rear end thereof and allowing the passage of the gang plank out of the space between the bottom and floor but preventing the passage of the block from said space, and a roller in the body outside of said space and remote from the shoulder over which the plank may move.

3. In combination, a truck body, slideway means in the truck body, a gang plank, a block, a strip of flexible material connecting one end of the gang plank with the block, said plank, said strip of flexible material and said block being slidable in the slideway, and means for preventing the block from being moved completely out of the slideway.

4. In combination, a truck body, slideway means in the truck body, a gang plank, a block, a strip of flexible material connecting one end of the gang plank with the block, said plank, said strip of flexible material, and said block being slidable in the slideway, means for preventing the block from being moved completely out of the slideway, and a roller journaled in the body remote from one end of the slideway over which the plank only may move.

In testimony whereof I affix my signature.

JOSEPH SCHIFTNER.